April 22, 1952 R. N. SUNDSTROM 2,593,499
GLASS FEEDER
Filed March 11, 1949 2 SHEETS—SHEET 1
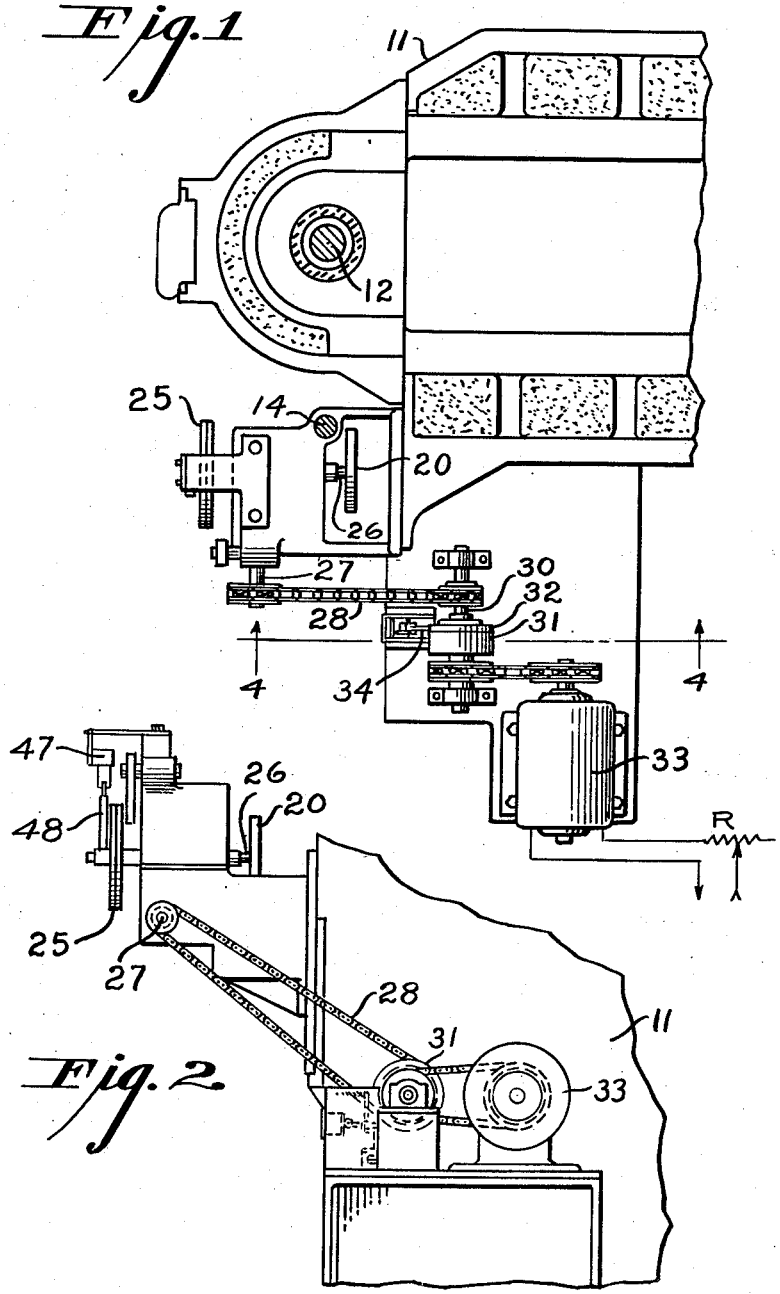
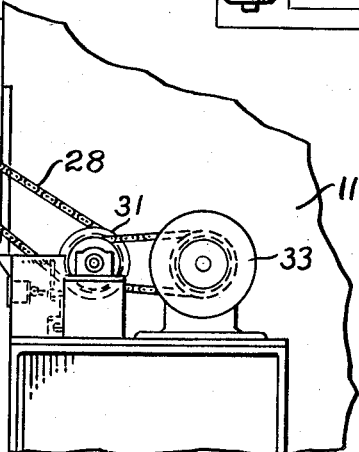
INVENTOR.
Roy N. Sundstrom
BY
Rolf E. Schneider
ATTORNEY April 22, 1952     R. N. SUNDSTROM     2,593,499
GLASS FEEDER
Filed March 11, 1949                             2 SHEETS—SHEET 2
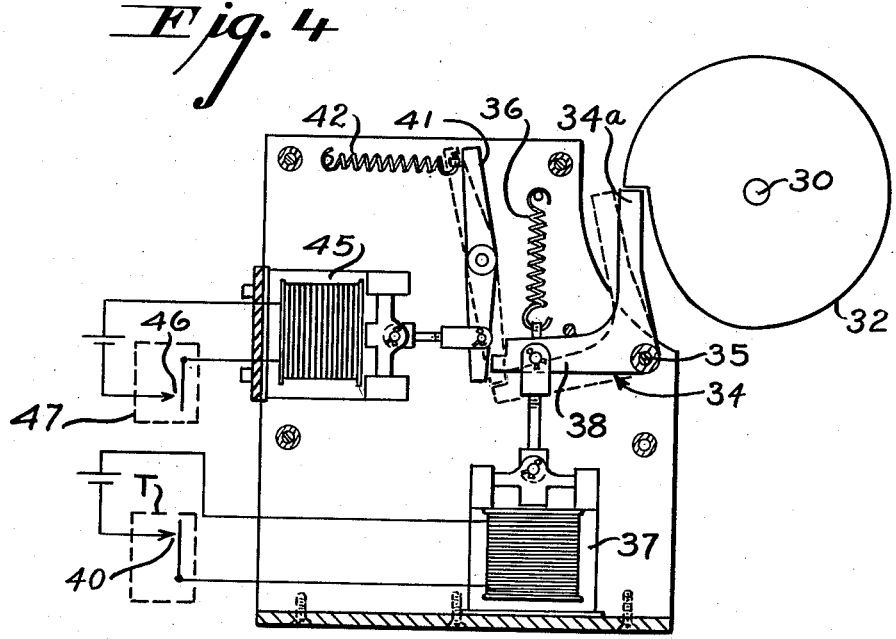
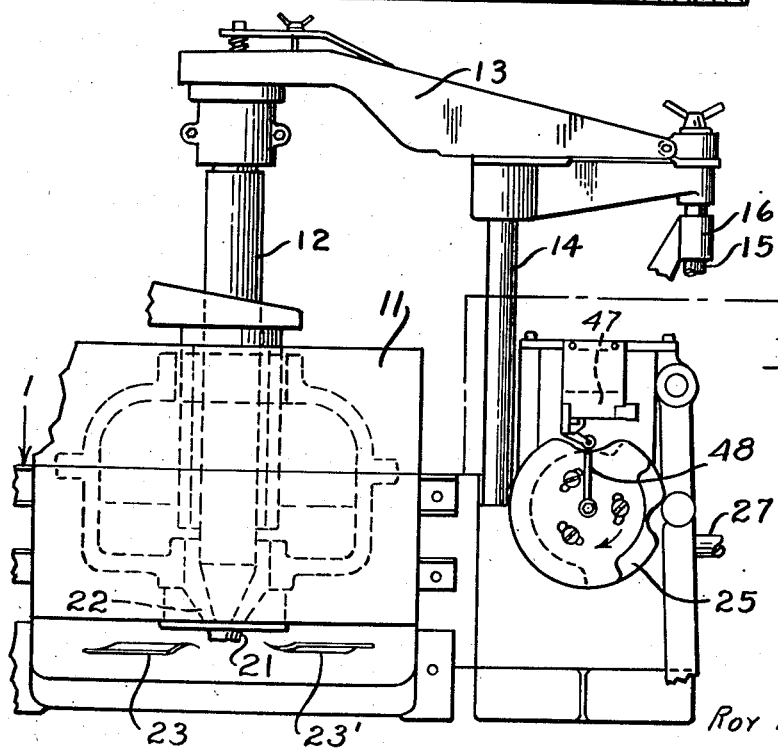
INVENTOR.
Roy N. Sundstrom Patented Apr. 22, 1952

2,593,499

UNITED STATES PATENT OFFICE 2,593,499

GLASS FEEDER

Roy N. Sundstrom, Corning, N. Y., assignor to Corning Glass Works, Corning, N. Y., a corporation of New York Application March 11, 1949, Serial No. 80,917

5 Claims. (Cl. 49—55)

The present invention relates to the feeding of mold charges of molten glass suspended from the bottom outlet of a forehearth of a glass-melting tank or the like.

The prime object of the invention is a glass-feeding system which is of particular utility under circumstances wherein the tank capacity is only sufficient for a restricted rate of output, or wherein the speed of operation of the fabricating equipment is so slow that conventional automatic methods of feeding charges thereto are impracticable.

Equipment for feeding molten glass mold charges, severed while in suspension below an outlet from the source of glass supply, for delivery en masse to the molds of an associated glassware fabricating machine, has been highly developed and is well known to the industry. The apparatus described in Peiler Patent No. 1,760,254, granted May 27, 1930, is representative of such equipment and includes a gob feeding needle or plunger arranged over a forehearth feeder outlet and adapted to be reciprocated vertically to extrude gobs or mold charges through the outlet, while shears operating in coordination with the needle sever the charges from the parent supply body. Although the needle in its lowermost position does not close the outlet, the outlet size, the glass viscosity, and the frequency of operation of the needle are so coordinated that only mold charges issue from the outlet.

Operation in this fashion is the accepted practice. It would appear at first blush that mold charges could be fed at a slower rate by adjustment of the needle to close the outlet during part of each cycle and thus space the charges to meet any slower rate of operation desired. It is not practicable to do this, however, since stopping of the operation allows the glass to chill near the outlet, rendering the subsequent mold charge containing such glass worthless.

Applicant has now discovered that if the feeder needle is allowed to remain in its down position between its operating cycles, and a small glass stream is permitted to flow during each such period, satisfactory mold charges can be periodically produced irrespective of the lapse of time therebetween. Under these circumstances the glass can be maintained at a viscosity deemed most suitable for formation, rather than at a compromise viscosity such as required by conventional feeders. In applicant's system, coincident with the beginning of an operating cycle of the needle, the shear blades are operated to sever the stream from the supply body and are again operated after formation of the mold charge to sever the charge from the supply body.

As will be appreciated, by employing the foregoing system, mold charges of the best temperature for formation can be automatically produced at any desired frequency. The system is also of utility in feeding mold charges to machines which make large pieces of ware and require a considerable time lapse between the receipt of successive mold charges. Such machines are often employed when production requirements do not justify a high-capacity output machine which could be fed by a conventional feeder.

Another advantage of applicant's system is that it affords a wide latitude of speeds of needle operation, enabling excellent control of the shape of mold charges produced. A further advantage of applicant's system is that the speed of operation of the needle can be varied at will to vary the mold charge weight without changing the frequency of charge delivery. A better shaped gob can thus be obtained in contrast with conventional feeder practice wherein the limited time during which the needle can be left in the down position seriously limits the latitude of adjustment of its rate of movement, and usually requires a glass viscosity higher than that best suited for use in the formation of the article to be produced; and wherein variation of speed of needle operation cannot be utilized to regulate the mold charge weight without also varying the frequency at which the charges are delivered.

A conventional feeder can be readily modified to operate in accordance with the invention by arranging for two operations of the shears per operating cycle, further modifying such apparatus to stop the needle during periods between its operating cycles, and by giving the needle cam a contour found by experience to give it the character of movement best suited for formation of a mold charge when a glass of a viscosity best suited for such charge is provided.

The accompanying drawings illustrate sufficient apparatus to teach applicant's method in light of the description and the disclosure of the cited Peiler patent. In such drawings, Fig. 1 is a plan view with parts in section, approximately on line 1—1 of Fig. 3, of a portion of a forehearth and of associated feeder equipment.

Fig. 2 is a side elevation of portions of the feeder equipment and forehearth shown in Fig. 1.

Fig. 3 is a front elevation of the forehearth and feeder, some details being omitted.

Fig. 4 is a sectional elevation, on an enlarged scale, of the feeder control apparatus and is taken generally along line 4—4 of Fig. 1. Fig. 4 also diagrammatically illustrates circuits for the control apparatus.

Referring to the drawings in detail, 11 represents the usual forehearth and 12 the usual needle which is suspended from an arm 13 (Fig. 3). Arm 13 is guided for vertical reciprocation by a rod 14, which slides in suitable vertically spaced guide bearings, not shown. Turning movement and resulting displacement of needle 12 with respect to rod 14 are prevented by a rod 15 depending from arm 13 and passing through a bearing 16. Reciprocation of the needle is effected in a conventional manner, as fully shown and described in the Peiler patent, by a needle cam 20 (Figs. 1 and 2).

Glass 21, issuing from forehearth outlet 22 (Fig. 3) is severed from the parent supply body of glass by shear blades 23 and 23'. These blades are operated by a conventional linkage, as fully shown and described in the Peiler patent, actuated by means of a shear cam 25 carried on a shaft 26 (Figs. 1 and 2) also supporting the needle cam 20. Cam 25 differs from those conventionally employed only to the extent that its configuration is such that it effects two operations of blades 23 and 23' for each revolution of shaft 26 instead of the usual one such operation per revolution of the shaft.

As fully disclosed in the Peiler patent, shaft 26 carries a worm wheel driven by a worm gear on a transverse shaft such as shaft 27. In conventional practice the shaft corresponding to 27 is continuously driven at a speed dependent on the rate at which delivery of mold charges is desired, and, as previously explained, since the turning movement of the cam shaft is continuous, the upward movement of the needle substantially immediately follows its arrival at its lowermost position.

In accordance with the present invention, commencement of the upward movement of the needle is delayed until it is desired to initiate formation and delivery of a succeeding mold charge. Referring now to the drawings in detail, shaft 27 is periodically driven, for example, by a chain 28 (Figs. 1 and 2) passing about a sprocket wheel carried by a countershaft 30. Shaft 30 is adapted to be driven by a motor 33 through the medium of a single revolution clutch 31 whenever its clutch control cam 32 is freed for rotation. A rheostat R enables ready adjustment of the speed of motor 33.

Cam 32 is normally held against rotation by arm 34a of a bell crank 34 (Figs. 1 and 4) pivoted at 35. A spring 36 normally holds arm 34a in the path of travel of cam 32. Movement of the bell crank clear of cam 32 is effected by energization of a magnet 37 whose armature is coupled to the arm 38 of the bell crank.

Magnet 37 is momentarily energized whenever a mold charge is desired, as determined by the frequency at which contacts 40 of a timing device T are set to close. Because of the fact that more than one revolution of shaft 30 is required to effect a single revolution of the cam shaft 26, provision is made to lock the bell crank 34 in the position in which its arm 34a is clear of cam 32 until after the cam has started its last revolution required to complete a single revolution of shaft 26. This is accomplished by providing a lever 41 cooperative with arm 38 of bell crank 34 under control of a spring 42 to lock the bell crank in its actuated position the instant its arm 34a is moved clear of the cam 32. A magnet 45 is provided to move lever 41 clear of the bell crank arm 38 at the proper time for its return to its initial position, under the influence of spring 36, to stop the turning movement of shafts 30 and 26 when needle 12 arrives at its lowermost position. To accomplish this, energization of magnet 45 is effected by closure of contacts 46 of a switch 47 by means of a switch-actuating arm 48 carried by shaft 26.

The cyclic operation in brief is as follows: With the needle 12 in its down position and a small stream flowing from outlet 22, the contacts 40 of timing device T momentarily close, magnet 37 becomes energized and thus turns bell crank 34 leftward about pivot 35 to move arm 34a clear of cam 32, thus freeing the cam 32 for rotation. Lever 41 under the influence of spring 42 immediately cooperates with bell crank arm 38 to lock it in its operated position independently of magnet 37, whose circuit is opened by contacts 40 before the operating cycle is completed. As the needle 12 starts to rise, shear blades 23 and 23' are actuated to sever the stream from the charge in process of formation, and after the needle has substantially completed its charge-extruding movement, are again operated to sever the charge from the parent supply body. As this laater movement is being completed, contacts 46 momentarily close to energize magnet 45 whose associated lever 41 is thus moved clear of bellcrank arm 38 to permit arm 34a to again move into the path of cam 32 and thus be enabled to stop the turning movement of shaft 27 as the needle arrives at its lowermost position.

What is claimed is:

1. The method which comprises flowing a small cross-section stream of molten glass from a supply body into an unconfined space, periodically increasing the cross-section of said stream to form a gob therein, and severing the stream at the point of formation of the gob immediately preceding and immediately following formation of the gob therein.

2. The method which comprises flowing a small cross-section stream of molten glass from a supply body into an unconfined space, periodically extruding a relatively large cross-section gob into the stream and severing the stream at the point of extrusion of the gob immediately preceding and immediately following extrusion of the gob thereinto.

3. In a glass charge feeder for use with a container having a bottom outlet through which glass in the container can flow by gravity, a needle normally positioned with respect to said outlet to permit a small-volume stream of glass to flow therethrough, apparatus for periodically reciprocating said needle to increase the volume of glass issuing from the outlet, said reciprocating apparatus including means adapted to maintain said needle stationary with respect to said outlet for a predetermined period following each reciprocation of said needle, shear blades arranged below the outlet, and mechanism for actuating said blades to shear the glass issuing from the outlet during the commencement of each reciprocation of the needle, and for again actuating said blades at the completion of each reciprocation thereof.

4. A feeder such as defined by claim 3 wherein the reciprocating apparatus includes a timing device to control the time of initiation of a reciprocation of said needle.

5. A feeder such as defined by claim 3, wherein the reciprocating apparatus includes a shaft carrying a needle-operating cam, a drive for said shaft including a clutch and a drive means therefor, means for momentarily activating said clutch to initiate the rotation of said shaft by the drive means, means for thereafter maintaining said clutch active, and means for disabling said last means to stop the turning movement of said shaft on its return of the needle to initial position.

ROY N. SUNDSTROM.

REFERENCES CITED

The following references are of record in the file of this patent:

UNITED STATES PATENTS

| Number | Name | Date |
|---|---|---|
| 1,525,189 | Lorenz | Feb. 3, 1925 |
| 1,628,238 | Ferngren | May 10, 1927 |
| 1,760,254 | Peiler | May 27, 1930 |
| 2,077,147 | Honiss | Apr. 13, 1937 |